United States Patent Office 3,686,237
Patented Aug. 22, 1972

3,686,237
O-(NITROARYL)OXIMES OF 3-KETO STEROIDS
Allen F. Hirsch, Somerville, N.J., assignor to
Ortho Pharmaceutical Corporation
No Drawing. Filed Dec. 4, 1969, Ser. No. 882,286
Int. Cl. C07c 169/22
U.S. Cl. 260—397.3                    21 Claims

ABSTRACT OF THE DISCLOSURE

O-(nitroaryl)oximes of variously substituted 3-keto steroids in which the aryl ring is in turn substituted in the ortho and/or para position with nitro groups are antilittering, anabolic and androgenic agents.

---

It has been discovered that the O-aryl oximes of variously substituted 3-keto steroids in which the aryl ring is in turn substituted in the ortho and/or para position with nitro groups, are anabolic and androgenic agents. Additionally many of these compounds are potent antilittering agents especially when administered orally post coitally.

The compounds of this invention are defined by the formula:

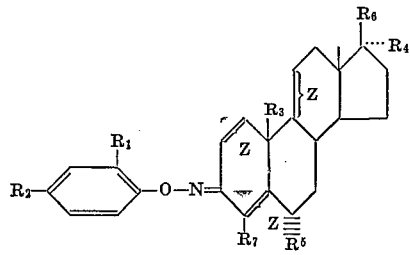

and

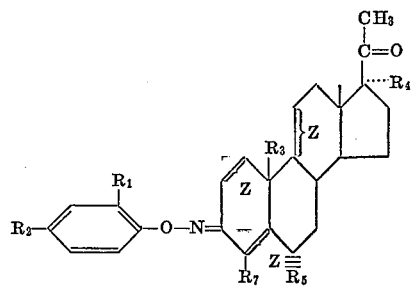

where

Z is a carbon to carbon single bond or a carbon to carbon double bond;
$R_1$ and $R_2$ are H or $NO_2$, and at least one of $R_1$ and $R_2$ is $NO_2$;
$R_3$ is H or $CH_3$;
$R_6$ is hydroxy or the esters thereof or keto;
$R_4$ is H or $CH_3$ or $CH_2$—$CH_3$ or ethinyl;
$R_5$ is H or $CH_3$; and
$R_7$ is hydrogen or halogen.

The compounds of this class which are potent antilittering are those where:

$R_1$ and $R_2$ are H or $NO_2$, at least one of $R_1$ and $R_2$ being $NO_2$, and when Z is a carbon to carbon single bond $R_2$ is $NO_2$ and $R_1$ is H;
$R_3$ is H or $CH_3$ and where $R_1$ is H, $R_3$ is $CH_3$;
$R_4$ is H or $CH_3$ or $CH_2$—$CH_3$ and where $R_1$ is H, $R_4$ is also H;
$R_5$ is H or $CH_3$;
$R_6$ is hydroxy or the esters thereof; and
$R_7$ is H.

The precursor ketones of these antilittering agents are generally ineffective as such and the parent oximes substantially less effective or ineffective.

The compounds are prepared from the parent keto steroids with the properly substituted O-arylhydroxylamine in the presence of an acid catalyst, or alternatively by reacting the oxime of the parent keto steroid with a properly substituted aryl halide in the presence of a suitable base, such as sodium hydride. The parent ketones are well-known in the art as are the methods of their preparation.

Various compounds of this invention are prepared as follows:

3-(2',4'-DINITROPHENOXY)IMINO COMPOUNDS (I) 3-(2',4'-dinitrophenoxy)imino-17α-methyl-androst-4-en-17β-ol In the absence of light, 2 drops of concentrated hydrochloric acid was added to a solution of 2.5 g. of methyltestosterone and 1.65 g. of O-(2',4'-dinitrophenyl) hydroxylamine [prepared as described in J. Het. Chem., 4, 413 (1967)] in 200 ml. of ethanol. The solution was stirred for 4 hours, concentrated and crystallized from ethanol affording 3.0 g. (75%) of 3-(2',4'-dinitrophenoxy)imino-17α-methyl-androst-4-en-17β-ol; M.P. 180–183; ultraviolet maximum ($CH_2Cl_2$) at 317 (ε 20,-300), 245 (ε 2,800); $[\alpha]_D^{24.9}$+134.4 (ethylene chloride).
Analysis.—Calcd. for $C_{26}H_{33}N_3O_6$ (percent): C, 64.58; H, 6.88; N, 8.69. Found (percent): C, 64.72; H, 6.94; N, 8.74.

(II) 3-(2',4'-dinitrophenoxy)imino-estr-4-en-17β-ol

In the absence of light, 2 drops of concentrated hydrochloric acid was added to a solution of 1.37 g. of 19-nortestosterone and 1.0 g. of O-(2,4-dinitrophenyl) hydroxylamine in 300 ml. of ethanol. The solution was stirred for 4 hours, concentrated and crystallized from ethanol affording 1.67 g. (73.2%) of 3-(2',4'-dinitrophenoxy)-imino-estr-4-en-17β-ol; M.P. 107–147; ultraviolet maximum ($CH_2Cl_2$) at 317 (ε 19,800), 245 (ε 2,000); $[\alpha]_D^{23.6}$+123.7 (ethylene chloride).
Analysis.—Calcd. for $C_{24}H_{29}N_3O_6$ (percent): C, 63.28; H, 6.42; N, 9.22. Found (percent): C, 63.12; H, 6.43; N, 9.18.

(IIIA) 3-(2',4'-dinitrophenoxy)imino-andrasta-1,4-dien-17β-ol

In the absence of light 1.40 g. of 1-dehydrotestosterone and 1.0 g. of O-(2',4'-dinitrophenyl) hydroxylamine was dissolved in 350 ml. ethanol and a few drops of concentrated hydrochloric acid added to the solution. The entire mixture was stirred at room temperature for two hours. The solution was evaporated to dryness and the resulting light yellow residue crystallized from ethanol; M.P. 106°–112° C., 154°–157° C., ultraviolet ($CH_2Cl_2$) at 325 (ε 22,300), 240 (ε 18,000).
Analysis.—Calcd. for $C_{25}H_{29}N_3O_6$ (percent): C, 64.23; H, 6.25; N, 8.99. Found (percent): C, 64.00; H, 6.33; N, 8.93.

(IIIB) 3-(2',4'-dinitrophenoxy)imino-androst-4-en-17β-ol

Starting with testosterone and following the procedure of Example I, 3-(2',4'-dinitrophenoxy)imino-4-androsten-17β-ol is prepared as a light yellow solid having a M.P. of 170.5–174.0°. Ultraviolet maximum ($CH_2Cl_2$) 315 (ε 19,700); 245 (ε 21,800) $[\alpha]_D^{23.6}$+155.0° (ethylene chloride).

*Analysis.*—Calcd. for $C_{25}H_{31}N_3O_6$ (percent): C, 63.95; H, 6.65; N, 8.95. Found (percent): C, 63.95; H, 6.75; N, 8.79.

(IV) 17β-enanthyloxy-3-(2′,4′-dinitrophenoxy)imino-androst-4-ene

In the absence of light, a drop of concentrated hydrochloric acid was added to a solution of 3.00 g. of androst-4-en-17β-ol-3-one-17-enanthate and 1.5 g. of O-(2,4-dinitrophenyl) hydroxylamine in 500 ml. ethanol. The solution was stirred for 3 hours, concentrated, and crystallized from ethanol affording 3.75 g. (86%) of 17β-enanthyloxy - 3 - (2′,4′ - dinitrophenoxy)imino-androst-4-ene; M.P. 118–123° C.; ultraviolet ($CH_2Cl_2$) at 318 mµ (ε 10,500) and 245 mµ (ε 23,100); $[\alpha]_D^{20.6°}$ $C.+153°$ (ethylene chloride).

*Analysis.*—Calcd. for $C_{32}H_{43}N_3O_7$ (percent): C, 66.07; H, 7.45; N, 7.22. Found (percent): C, 66.29; H, 7.52; N, 7.24.

(V) 3-(2′,4′-dinitrophenoxy)imino-6α-methyl-17α-acetoxy-pregn-4-en-20-one

In the absence of light, 1–2 drops of concentrated hydrochloric acid was added to a solution of 1.86 g. of 6α-methyl-17α-acetoxy-pregn-4-ene-3,20-dione and 1.00 g. of O-(2,4-dinitrophenyl) hydroxylamine in 300 ml. of ethanol. After stirring at room temperature for 18 hours, the solution was concentrated under vacuum. The residue was crystallized from ethanol yielding 1.81 g. (63%) of 3-(2′,4′ - dinitrophenoxy)imino - 17α-acetoxy-6α-methyl-pregn-4-en-20-one which was subsequently refluxed for 2.5 hours with freshly distilled hexane to remove any ethanol of crystallization. Evaporation of the hexane yielded the compound M.P. 129–133°; ultraviolet maximum ($CH_2Cl_2$) at 315 (ε 18,900), 245 (ε 21,700); $[\alpha]_D^{24.6}+113.0°$ (ethylene chloride).

*Analysis.*—Calcd. for $C_{30}H_{37}N_3O_8$ (percent): C, 63.48; H, 6.57; N, 7.40. Found (percent): C, 63.38; H, 6.85; N, 7.22.

(VI) 3-(2′,4′-dinitrophenoxy)imino-19-nor-pregn-4-en-17α-ol

In the absence of light, 1.4 g. of 17-ethyl-19-nortestosterone and 1.0 g. of O-(2,4-dinitrophenyl) hydroxylamine were dissolved in 350 ml. ethanol; and a few drops of concentrated HCl were added to the solution. The total solution was then stirred at room temperature for 1½ hours; and then evaporated to dryness. The resulting pale, yellow residue was crystallized from ethanol yielding 0.63 g. (26%) of 3 - (2′,4′ - dinitrophenoxy)-imino-19-nor-pregn-4-en-17β-ol; M.P. 168–176° C. decomposition; ultraviolet maximum ($CH_2Cl_2$) at 316 (ε 19,800), 245 (ε 22,100).

*Analysis.*—Calcd. for $C_{26}H_{33}N_3O_6$ (percent): C, 64.58; H, 6.88; N, 8.69. Found (percent): C, 64.50; H, 6.87; N, 8.57.

(VII) 3-(2′,4′-dinitrophenoxy)imino-19-nor-17α-pregn-4-en-20-yn-17-ol

In the absence of light, a mixture of 1.49 g. (0.005 mole) of norethindrone, 1 g. of O-(2,4 - dinitrophenyl) hydroxylamine (0.005 mole) and 500 ml. of ethyl alcohol was heated to affect solution. To the warm solution was added 5 drops of concentrated hydrochloric acid. The solution was stirred for 1 hour after which time an additional 50 mg. of O-(2,4-dinitrophenyl) hydroxylamine was added. The solution was concentrated under reduced pressure and the residue crystallized from ethanol affording 1.61 g. of yellow crystals which melted at 179–184° C.; ultraviolet maximum ($CH_2Cl_2$) at 427 (ε 20,500), 408 (ε 19,500).

*Analysis.*—Calcd. for $C_{26}H_{29}N_3O_6$ (percent): C, 65.12; H, 6.10; N, 8.76. Found (percent): C, 65.29; H, 6.25; N, 8.87.

(VIII) 3-(2′,4′-dinitrophenoxy)imino-5α-androstan-17β-ol 0.96 gram of sodium hydride was added to a solution of 6.30 grams of dihydrotestosterone oxime in 50 ml. of tetrahydrofuran. After refluxing for one hour, 50 ml. of dimethyl sulfoxide and 14 grams of 2,4 dinitrofluorobenzene were added. The solution was refluxed for three minutes, poured into water and filtered. Upon chromatography on a column eluted with a mixture of 90 parts chloroform and 10 parts acetone, and subsequent crystallization from ethanol there was obtained 3.70 g. of product, M.P. 108–111° C. ultraviolet ($CH_2Cl_2$) at 307 (ε 15,900).

*Analysis.*—Calcd. for $C_{25}H_{35}N_5O_6$ (percent): C, 63.68; H, 7.05; N, 8.91. Found (percent): C, 63.68; H, 7.12; N, 8.89.

(IX) 17β-acetoxy-3-(2′,4′-dinitrophenoxy)imino-5α-androstane

In the absence of light, a drop of concentrated hydrochloric acid was added to a solution of 2.98 g. of dihydrotestosterone-acetate and 1.8 g. of O-(2,4-dinitrophenyl) hydroxylamine in 200 ml. methanol. The solution was refluxed, with stirring, for one hours, concentrated, washed with water, and crystallized from ethanol affording 3.25 g. (71%) of 17β-acetoxy-3-(2′,4′-dinitrophenoxy)imino-5α-androstane; M.P. 175–177° C.; ultraviolet ($CH_2Cl_2$) at 307 (ε 16,800); $[\alpha]_D^{26.7°}+29.6°$ (ethylene chloride).

*Analysis.*—Calcd. for $C_{27}H_{35}N_3O_7$ (percent): C, 63.14; H, 6.87; N, 8.18. Found (percent): C, 63.22; H, 6.85; N, 8.14.

(X) 17α-methyl-3-(2′,4′-dinitrophenoxy)imino-androsta-4,9(11)-dien-17β-ol

In the absence of light, a drop of concentrated hydrochloric acid was added to a solution of 2.15 g. of androsta-4,9(11)-dien-17β-ol-3-one and 1.5 g. of O-(2,4-dinitrophenyl) hydroxylamine in 500 ml. ethanol. The solution was stirred for 3 hours, concentrated, and crystallized from ethanol affording 2.05 g. (60%) of 17α-methyl-3-(2′,4′-dinitrophenoxy)imino-androsta-4,9(11)-dien - 17β-ol; M.P. 168–172° C.; ultraviolet ($CH_2Cl_2$) at 318 mµ (ε 20,800) and 247 mµ (ε 22,900); $[\alpha]_D^{24.7°C.}+122$ (ethylene chloride).

*Analysis.*—Calcd. for $C_{26}H_{32}N_3O_6$ (percent): C, 64.71; H, 6.68; N, 8.70. Found (percent): C, 64.74; H, 6.56; N, 8.71.

3-(P-NITROPHENOXY)IMINO COMPOUNDS (XI) 3-(p-nitrophenoxy)imino-androsten-4-en-17β-ol To a solution of 1.33 g. of tert-butyl N-hydroxy carbamate and 0.66 g. of potassium hydroxide (85%) dissolved in 20 ml. of ethanol was added dropwise a solution of 1.41 g. of p-fluoronitrobenzene in 20 ml. of ethanol. The solution was stirred for 18 hours, poured onto ice water and the resulting solid filtered and washed well with water. Crystallization from benzene-hexane afforded afforded 2.15 g. (84.5%) of tert-butyl N-(p-nitrophenoxy) carbamate as white crystals, M.P. 106–108°.

*Analysis.*—Calcd. for $C_{11}H_{14}N_2O_5$ (percent): C, 51.97; H, 5.55; N, 11.02. Found (percent): C, 51.80; H, 5.62; N, 11.18.

A solution of 12 g. of tert-butyl N-(p-nitrophenoxy) carbamate in 45 ml. of trifluoroacetic acid was stirred for 15 minutes, poured onto 300 ml. of ice water, filtered and the solid dried. The mother liquor was neutralized with potassium carbonate affording additional product. The total yield of combined product was 5.49 g. (75.5%) which was subsequently crystallized from ethanol yielding pure O-(p-nitrophenyl) hydroxylamine; M.P. 126.5–128°; ultarviolet maximum ($CH_2Cl_2$) at 308 (ε 11,400).

*Analysis.*—Calcd. for $C_6H_6N_2O_3$ (percent): C, 46.76;

H, 3.92; N, 18.18. Found (percent): C, 46.94; H, 3.87; N, 18.00.

In the absence of light, 2 drops of concentrated hydrochloric acid was added to a solution of 1.39 g. of testosterone and 0.75 g. of O-(p-nitrophenyl)hydroxylamine in 175 ml. of ethanol. The solution was stirred for 3 hours, concentrated and crystallized from ethanol affording 1.52 g. (74%) of 3-(p-nitrophenoxy)imino-androst-4-en-17β-ol; M.P. 133.5–188; ultraviolet maximum ($CH_2Cl_2$) at 328 (ε 18,300), 260 (ε 13,200); $[\alpha]_D^{23.9}$+165.3° (ethylene chloride).

*Analysis.*—Calcd. for $C_{25}H_{32}N_2O_4$ (percent): C, 70.73; H, 7.60; N, 6.60. Found (percent): C, 70.81; H, 7.41; N, 6.44.

(XII) 3-(p-nitrophenoxy)imino-17α-methyl-androst-4-en-17β-ol

In the absence of light, 2 drops of concentrated hydrochloric acid was added to a solution of 1.51 g. of methyltestosterone and 0.77 mg. of O-(p-nitrophenyl) hydroxylamine in 175 ml. of ethanol. After stirring for 2½ hours, the solution was concentrated and crystallized from ethanol affording 1.46 g. (67%) of 3-(p-nitrophenoxy)imino-17α-methylandrost-4-en-17β-ol; M.P. 180–184; ultraviolet maximum ($CH_2Cl_2$) at 326 (ε 17,600), 360 (ε 12.900); $[\alpha]_D^{24}$+150.1 (ethylene chloride).

*Analysis.*—Calcd. for $C_{26}H_{34}N_2O_4$ (percent): C, 71.21; H, 7.81; N, 6.39. Found (percent): C, 71.36; H, 7.94; N, 6.48.

(XIII) 3-(p-nitrophenoxy)imino-estr-4-en-17β-ol

In the absence of light 2 drops of concentrated hydrochloric acid was added to a solution of 2.09 g. of 19-nortestosterone and 0.93 g. of O-(p-nitrophenyl) hydroxylamine in 200 ml. of ethanol. After stirring for 24 hours the solution was concentrated and crystallized from ethanol affording 1.29 g. (41.5%) of 3-(p-nitrophenoxy)imino-estr-4-en-17β-ol; M.P. 174–184; ultraviolet maximum ($CH_2Cl_2$) at 257 (ε 14,200), 327 (ε 20,100); $[\alpha]_D^{31.1}$+137.0 ethylene chloride).

*Analysis.*—Calcd. for $C_{24}H_{30}N_2O_4$ (percent): C, 70.22; H, 7.37; N, 6.82. Found (percent): C, 70.27; H, 7.45; N, 6.89.

(XIV) 17β-acetoxy-3-(p-nitrophenoxy)imino-5α-androstane

To a solution of 2.16 g. of 5α-dihydrotestosterone acetate and 1.0 g. of O-(p-nitrophenyl) hydroxylamine in 200 ml. of ethanol was added 2 drops of concentrated hydrochloric acid. The solution was stirred for 3 hours, concentrated and crystallized from ethanol affording 1.954 g. (64%) of 17β-acetoxy-3-(p-nitrophenoxy)imino-5α-androstane; M.P. 173–175; ultraviolet maximum ($CH_2Cl_2$)

at 320 (ε 15,900); $[\alpha]_D^{23.2}$+27.7 (ethylene chloride).

*Analysis.*—Calcd. for $C_{27}H_{36}N_2O_5$ (percent): C, 69.21; H, 7.74; N, 5.98. Found (percent): C, 69.13; H, 7.69; N, 5.94.

(XV) 3-(p-1-nitrophenoxy)imino-5α-androstan-17β-ol

To a solution of 3.05 g. of dihydrotestosterone oxime in 50 ml. of tetrahydrofuran was added 0.48 g. of sodium hydride (62.4%). After refluxing for one hour, 50 ml. of dimethyl sulfoxide and 1.41 g. of p-fluoronitrobenzene were added. The solution was refluxed 5 minutes and poured into water. The precipitate was filtered and crystallized from ethanol affording 1.60 g. (38%) of 3-(p-nitrophenoxy)imino-5α-androstan-17β-ol; M.P. 170–173° C.; ultraviolet ($CH_2Cl_2$) at 319 mμ (ε 16,200); $[\alpha]_D^{75°C.}$+6° (ethylene chloride).

*Analysis.*—Calcd. for $C_{25}H_{34}N_2O_4$ (percent): C, 70.40; H, 8.03; N, 6.57. Found (percent): C, 70.36; H, 8.11; N, 6.54.

(XVI) 3-(p-nitrophenoxy)imino-androst-4-en-17-one

In the absence of light, 2 drops of concentrated hydrochloric acid was added to a solution of 1.86 g. of androstenedione and 1.0 g. of O-(p-nitrophenyl) hydroxylamine in 200 ml. of ethanol. The solution was stirred for 6.5 hours, concentrated and crystallized from ethanol affording 1.14 g. (41.5%) of 3-(p-nitrophenoxy)imino-androst-4-en-17-one; M.P. 193–198; ultraviolet maximum ($CH_2Cl_2$)

at 327 (ε 20,700), 257 (ε 14,300), 232 (ε 17,200); $[\alpha]_D^{22.4}$+219.3 (ethylene chloride).

*Analysis.*—Calcd. for $C_{25}H_{30}N_2O_4$ (percent): C, 71.07; H, 8.16; N, 6.63. Found (percent): C, 71.04; H, 7.06; N, 6.56.

(XVII) 3-(p-nitrophenoxy)-4-chloro-17-acetoxy-androst-4-ene

In the absence of light, 2 drops of concentrated hydrochloric acid was added to a solution of 2.37 g. of 4-chlorotestosterone acetate and 1.0 g. of O-(p-nitrophenyl) hydroxylamine in 800 ml. of ethanol. The solution was stirred for 2 days, concentrated and crystallized from methylene chloride: ethanol affording 1.44 g. (44.3%) of 3-(p-nitrophenoxy)imino-4-chloro-17 - acetoxy - androst-4-ene; M.P. 219–219.5; ultraviolet maximum ($CH_2Cl_2$) at 320 (ε 22,400), 260 (ε 14,000), 234 (ε 11,900); $[\alpha]_D^{24.1}$+120.8 (ethylene chloride).

*Analysis.*—Calcd. for $C_{27}H_{33}N_2O_5Cl$ (percent): C, 64.72; H, 6.63; N, 5.59; Cl, 7.07. Found (percent): C, 64.84; H, 6.66; N, 5.61; Cl, 7.02.

(XVIII) 3-(p-nitrophenoxy)imino-17α-pregn-4-en-20-yn-17β-ol

In the absence of light, 2 drops of concentrated hydrochloric acid was added to a solution of 2.03 g. of ethisterone and 1.0 g. of O-(p-nitrophenyl)hydroxylamine in 900 ml. of ethanol. The solution was stirred for 24 hours, concentrated and crystallized from ethanol affording 1.99 g. (68.2%) of 3-(p-nitrophenoxy)imino-17α-pregn-4-en-20-yn-17β-ol; M.P. 111–159; ultraviolet maximum ($CH_2Cl_2$)

at 327 (ε 20,400), 258 (ε 13,300), 232 (ε 17,500); $[\alpha]_D^{26.3}$+127.7 (ethylene chloride).

*Analysis.*—Calcd. for $C_{27}H_{32}N_2O_4$ (percent): C, 72.30; H, 7.19; N, 6.25. Found (percent): C, 72.11; H, 7.12; N, 6.15.

As noted previously many compounds of this invention are potent antilittering agents. Antilittering activity is measured as follows:

A test group of rats is fed a calculated amount of a test substance in the feed for a period of 7 days during which time males and females are kept separate with both sexes receiving the test substance. Thereafter, the males and females are cohabited and the diet fed is continued for 15 days. At the end of this time the cohabitation is ended and the drug removed from the diet, the females are then observed for a period of 21 days and are allowed to deliver their young, if any, and to raise them. A control group of rats is handled in precisely the same way at the same time except that their diet does not include the test substance.

The following table illustrates the percentage of rats which give birth at the dosage level indicated.

| Compound of Example— | Dosage level, mg./kg. | | Percent of animals giving birth |
|---|---|---|---|
| | Theory | Actual | |
| I | 10 | 8.8 | 0 |
| II | 10 | 8.3 | 0 |
| IIIB | 20 | 15.2 | 0 |
| IV | 20 | 17.4 | 0 |
| V | 20 | 18.9 | 0 |
| XIV | 40 | 13.2 | 12.5 |

These compounds also exhibit post coital antilittering properties when administered on days 9–12 after coitus to the rat. The following table illustrates the percentage of resorptions obtained at the indicated dosage levels. The activity of the parent ketone and unsubstituted oxime is also noted.

| Compound of Example— | Dosage level, mg./kg. | Percent resorptions | | |
|---|---|---|---|---|
| | | Compound | Parent ketone | Oximes |
| II | 20 | 100 | | 39.5 |
| II | 40 | | 20.6 | |
| IIIA | 40 | 100 | | |
| IIIB | 10 | 80 | | |
| IIIB | 40 | | 8.2 | 91.2 |
| XI | 40 | 100 | | |
| XIV | 2.5 | 96.6 | | |
| XIV | 20 | | | 2.5 |
| XIV | 40 | | 5.0 | |
| XV | 2.5 | 100 | | |
| XV | 20 | 100 | | |
| XV | 40 | | 6.9 | 1.6 |

While all of the compounds are at least weak anabolic agents, a number of the compounds are unusually potent anabolic agents. The compound of Example II has a ventral prostate potency of 0.15 as compared to methyltestosterone and a levator ani potency of 2.1 when compared to methyltestosterone. Thus the anabolic:androgenic ratio is very favorable. This is also true of the compound of Example VI which has an anabolic:androgenic ratio of 12.5 with a ventral prostate potency of 0.18 and a levator ani potency of 2.24 when compared to methyltestosterone, and the compound of Example X which has a ventral prostate potency of 1.9 and a levator ani potency of 4.6.

What is claimed is:

1. Compounds of the formula:

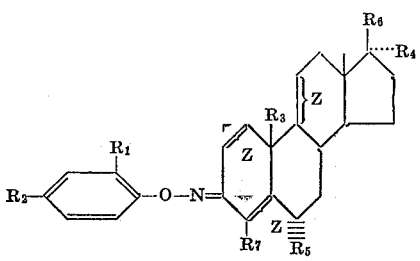

and

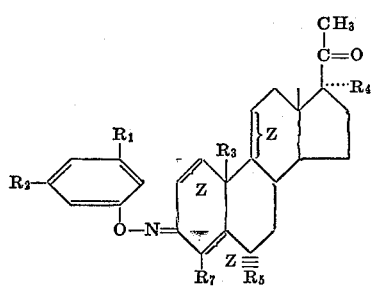

where

Z is a carbon to carbon single bond or a carbon to carbon double bond;

$R_1$ and $R_2$ are H or $NO_2$, and at least one of $R_1$ and $R_2$ is $NO_2$;
$R_3$ is H or $CH_3$;
$R_6$ is hydroxy or the esters thereof or keto;
$R_4$ is H or $CH_3$ or $CH_2$—$CH_3$ or ethinyl;
$R_5$ is H or $CH_3$; and
$R_7$ is hydrogen or halogen.

2. Compounds of claim 1 wherein
$R_1$ and $R_2$ are H or $NO_2$, at least one of $R_1$ and $R_2$ being $NO_2$, and when Z is a carbon to carbon single bond $R_2$ is $NO_2$ and $R_1$ is H;
$R_3$ is H or $CH_3$ and where $R_1$ is H, $R_3$ is $CH_3$;
$R_4$ is H or $CH_3$ or $CH_2$—$CH_3$ and where $R_1$ is H, $R_4$ is also H;
$R_5$ is H or $CH_3$;
$R_6$ is hydroxy or the esters thereof; and
$R_7$ is H.

3. 3 - (2',4'-dinitrophenoxy)imino-17α-methyl-androst-4-en-17β-ol of claim 1.

4. 3 - (2',4'-dinitrophenoxy)imino-ester-4-en-17β-ol of claim 1.

5. 3 - (2',4'-dinitrophenoxy)imino-androst-4-en-17β-ol of claim 1.

6. 17β - enanthyloxy - 3-(2',4'-dinitrophenoxy)imino-androst-4-ene of claim 1.

7. 3 - (2',4'-dinitrophenoxy)imino-6α-methyl-17α-acetoxy-pregn-4-en-20-one of claim 1.

8. 3 - (2',4'-dinitrophenoxy)imino - 19-nor-pregn-4-en-17α-ol of claim 1.

9. 3 - (2',4'-dinitrophenoxy)imino-19-nor-17α-pregn-4-en-20-yn-17-ol of claim 1.

10. 3 - (2',4'-dinitrophenoxy)imino-5α-androstan-17β-ol of claim 1.

11. 17β - acetoxy - 3-(2',4'-dinitrophenoxy)imino-5α-androstane of claim 1.

12. 17α - methyl - 3-(2',4'-dinitrophenoxy)imino-androsta-4,9(11)-dien-17β-ol of claim 1.

13. 3 - (p-nitrophenoxy)imino-androst-4-en-17β-ol of claim 1.

14. 3-(p-nitrophenoxy)imino - 17α - methyl-androst-4-en-17β-ol of claim 1.

15. 3 - (p-nitrophenoxy)imino - estr-4-en-17β-ol of claim 1.

16. 17β - acetoxy - 3 - (p-nitrophenoxy)imino-5α-androstane of claim 1.

17. 3 - (p-nitrophenoxy)imino - 5α-androstan-17β-ol of claim 1.

18. 3 - (p-nitrophenoxy)imino-androst-4-en-17-one of claim 1.

19. 3 - (p-nitrophenoxy)-4-chloro-17-acetoxy-androst-4-ene of claim 1.

20. 3 - (p-nitrophenoxy)imino - 17α-pregn-4-en-20-yn-17β-ol of claim 1.

21. 3 - (2',4'-dinitrophenoxy)imino-androsta-1,4-diene-17β-ol of claim 1.

References Cited
UNITED STATES PATENTS 3,502,658   3/1970   Ledig et al. _____ 260—239.5
3,503,959   3/1970   Christiansen et al. __ 260—239.5

ELBERT L. ROBERTS, Primary Examiner

U.S. Cl. X.R.
260—397.4, 397.5

UNITED STATES PATENT OFFICE
CERTIFICATE OF CORRECTION

Patent No. 3,686,237    Dated August 22, 1972

Inventor(s) Allen F. Hirsch

It is certified that error appears in the above-identified patent and that said Letters Patent are hereby corrected as shown below:

In Column 3, line 43, "1.4g" should read --- 1.48g ---.

In Column 4, line 16, "N,8.89" should read --- N,8.98 ---.

In Column 4, line 60, "afforded afforded" should read --- afforded ---.

In Column 4, line 74, "ultarviolet" should read --- ultraviolet ---.

In Column 5, line 61, "3-(P-1-Nitrophenoxy)" should read --- 3-(P-Nitrophenoxy) ---.

Signed and sealed this 22nd day of May 1973.

(SEAL)
Attest:

EDWARD M. FLETCHER, JR.
Attesting Officer

ROBERT GOTTSCHALK
Commissioner of Patents